United States Patent [19]
Diebel et al.

[11] Patent Number: 5,638,944
[45] Date of Patent: Jun. 17, 1997

[54] IGNITION CYLINDER ANTI-THEFT SENSOR CONTACT MECHANISM

[75] Inventors: David A. Diebel, Canton; David R. Mannisto, Livonia; Alan J. Minsterman, Canton; John F. Kennedy, Dearborn, all of Mich.

[73] Assignee: Ford Motor Company, Dearborn, Mich.

[21] Appl. No.: 526,426

[22] Filed: Sep. 11, 1995

[51] Int. Cl.⁶ .................................................. H01H 27/06
[52] U.S. Cl. ........................... 200/43.03; 200/51.09; 200/51 R; 200/244; 439/488
[58] Field of Search .................. 200/43.03, 43.04, 200/551, 538, 268, 295, 244, 51.09, 51.01, 51.13, 542, 537, 51 R, 61.4; 439/488, 489

[56] References Cited

U.S. PATENT DOCUMENTS

| | | | |
|---|---|---|---|
| 3,249,725 | 5/1966 | Hutt et al. | 200/551 |
| 3,723,677 | 3/1973 | Arias | 200/43.04 |
| 4,114,412 | 9/1978 | Braatz . | |
| 4,211,905 | 7/1980 | Quigley | 200/285 |
| 4,262,506 | 4/1981 | Tobel . | |
| 4,465,742 | 8/1984 | Nageshimo et al. | 200/268 |
| 4,679,026 | 7/1987 | Knakowski et al. . | |
| 4,803,460 | 2/1989 | Rhee et al. . | |
| 4,805,233 | 2/1989 | Robitschko et al. . | |
| 4,900,880 | 2/1990 | Breed . | |
| 4,939,329 | 7/1990 | Dankert | 200/542 |
| 5,161,422 | 11/1992 | Suman et al. . | |
| 5,434,375 | 7/1995 | Kawada et al. | 200/51 R |

*Primary Examiner*—David J. Walczak
*Attorney, Agent, or Firm*—David B. Kelley

[57] ABSTRACT

An anti-theft sensor contact mechanism for an ignition system of an automotive vehicle has a sensor contact mechanism 24 which utilizes a non-conducting lever 46 to sense the physical presence of a lock liner 26 within a lock cylinder 28 of the ignition system and to depress a moveable contact 40 against a stationary contact 38 of the same metal for closing a path in an electrical monitoring, or sensing, circuit 32. When the lock liner 26 is removed, such as when tampered with during theft of the vehicle, the sensor contact mechanism 24 causes a break in an electrical path in the circuit 32 through movement of the moveable contact 40 to a non-contacting position with the stationary contact 38 so that a conventional alarm system may be triggered to sound an audible or visible. Electrical continuity between the contacts 38, 40 is enhanced by enclosing them within a housing 34 through which the lever 46 protrudes to prevent dirt, grease, oil, and other surface coating debris from inhibiting electrical contact therebetween. The electrical circuit 32 is not grounded through the steering column casting 30 through the lever 46 or either the stationary or moveable contacts 38, 40, but is grounded through continuous wires 64, 66 attached to the contacts.

11 Claims, 2 Drawing Sheets

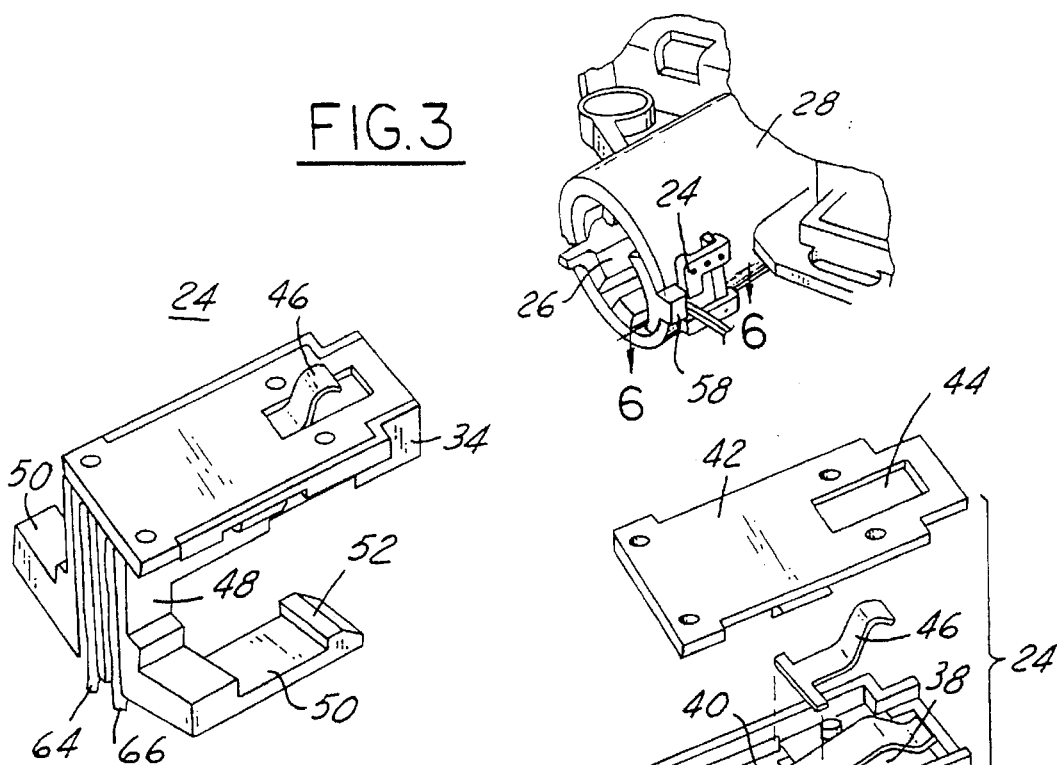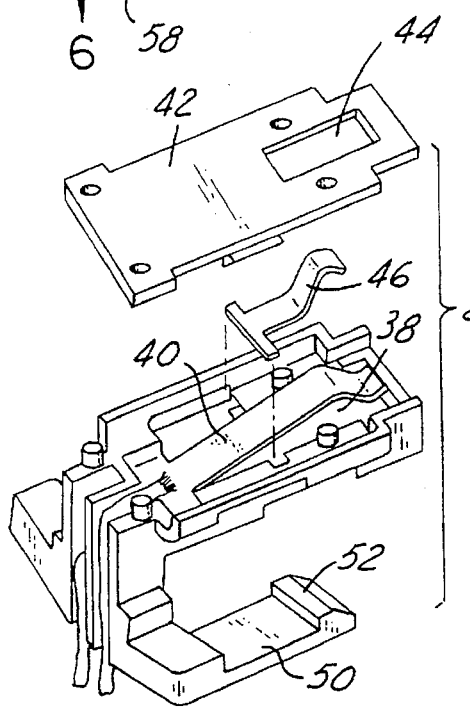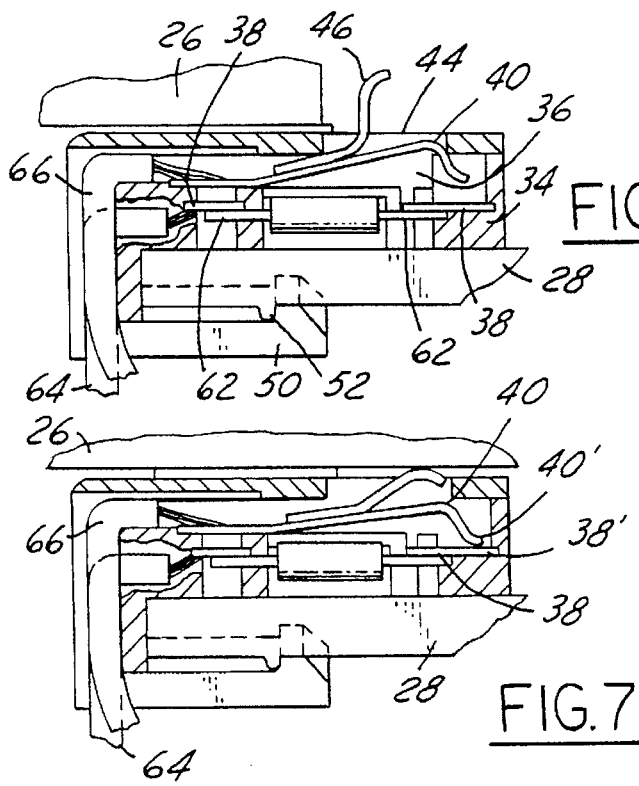

5,638,944

IGNITION CYLINDER ANTI-THEFT SENSOR CONTACT MECHANISM

FIELD OF THE INVENTION

The present invention relates to automotive anti-theft systems in general, and more specifically to an improved ignition cylinder anti-theft sensor contact mechanism.

BACKGROUND OF THE INVENTION

Anti-theft systems for sensing the physical presence, or absence, of an apparatus typically rely on an electrical circuit having contacts touching an enclosure, usually connected to ground, which houses the apparatus. For example, a car radio may have a contact thereon which completes an electrical alarm circuit by touching a frame on an automotive dashboard into which the radio is inserted, as shown in U.S. Pat. No. 4,805,233 (Robitschko et al.). Lear-spring type contacts for completing an electrical alarm circuit are known which may be attached either to the radio or to the enclosure, such as disclosed in U.S. Pat. No. 4,679,026 (Knakowswi et al.).

Use of a lear-spring type contact in an anti-theft system to sense the presence of a lock assembly in a lock housing of an automotive ignition system was shown in U.S. Pat. No. 4,803,460 (Rhee et al.), assigned to the assignee of the present invention and incorporated herein by reference. As seen in FIG. 8, the anti-theft system of that patent employs a resilient contact 124 which is compressed against the internal surface of a housing 150 when a lock assembly 140 is inserted therein to provide a continuous ground for a resistor 122 in a circuit (not shown). Upon forced removal of the lock 140 from the housing 150, the contact 124 breaks contact with the housing 150 causing an interruption in the electrical path through the resistor 122 and triggering the circuit to activate a conventional alarm system, for example, an audio or visual alarm.

The contacts in prior apparatus presence sensing anti-theft systems generally serve both as a mechanical sensor, which senses the physical presence of the apparatus, and an electrical sensor, which provides electrical continuity or discontinuity to an alarm circuit. One disadvantage of these sensing assemblies is that the contact surfaces may be exposed to oil, grease, dirt, and other surface coating substances, thus inhibiting electrical contact therebetween. In addition, galvanic corrosion, perhaps induced by current flowing through the actuation mechanism, can degrade contact pressure between the contact surfaces when made of dissimilar metals. Either of these problems may trigger false alarms.

A particular problem with anti-theft systems for vehicle ignitions systems is that they typically are grounded to the steering column casing and require a screw and lug to complete the ground path. Such a design not only increases assembly and disassembly time, but also has other disadvantages. For example, the ground path through the steering column will vary between vehicle models due to differences in column design, column material properties, and method of attachment to the vehicle, thus requiring accomodation of the screw and lug. Additionally, the ground impedance provided by the screw and lug may change over time due to galvanic corrosion or due to the steering column not adequately connected to the chassis. Finally, the steering column with a screw and lug or other like system is subject to corrosion and loss of torque on the screw which will cause an open ground circuit and system failure.

SUMMARY OF THE INVENTION

The present invention overcomes the disadvantages of the related art by providing an anti-theft sensor contact mechanism which utilizes a non-conducting lever to sense the physical presence of a lock liner within a lock cylinder and to depress a moveable contact against a stationary contact of the same metal for closing a path in an electrical sensing circuit. Electrical continuity between the contacts is enhanced by enclosing them within a housing through which the lever protrudes. The electrical circuit is not grounded through the steering column casting by the lever or either the stationary or moveable contacts, but is grounded through continuous wires attached to the contacts.

An advantage of the present invention is an anti-theft sensor contact mechanism which increases contact reliability between the actuating contacts.

Another advantage is an anti-theft sensor contact mechanism which is easy to assemble and disassemble.

Still another advantage of the present invention is an anti-theft sensor contact mechanism which reduces galvanic corrosion between the contacts.

Yet another advantage is an anti-theft sensor contact mechanism which is not grounded through the sensor actuating contact to the steering column casting.

A feature of the present invention is a non-conducting actuation lever which presses a moveable contact into electrical connection with a stationary contact.

Another feature is a sensor housing which isolates the moveable and stationary contacts from grease, oil, dirt and other debris so as to maintain electrical contact therebetween.

Still another feature of the present invention is an anti-theft sensor contact mechanism having contacts made of the same metal.

Yet another feature is an anti-theft sensor contact mechanism having gold plated contacts.

Yet still another features is an anti-theft sensor contact mechanism which has continuous wires connected to the contacts thereof so as to eliminate grounding through the steering column casting.

BRIEF DESCRIPTION OF THE DRAWINGS

These and other objects, advantages, and features of the present invention will be apparent to those skilled in the anti-theft system arts upon reading the following description with reference to the accompanying drawings, in which:

FIG. 3 is a perspective view of a lock liner shown inserted in the lock cylinder of a steering column casting with an anti-theft sensor contact mechanism of the present invention attached thereto;

FIG. 4 is a perspective view of an anti-theft sensor contact mechanism of the present invention;

FIG. 5 is an exploded perspective view of the mechanism of FIG. 4;

FIG. 6 is a cross-sectional view of an anti-theft sensor contact mechanism according to the present invention with a moveable contact shown in the undepressed, non-contacting position;

FIG. 7 is a cross-sectional view similar to FIG. 6 but shown with the moveable contact in the depressed, contacting position; and FIG. 8 is a cross-sectional view of a prior art anti-theft sensor contact mechanism.

DETAILED DESCRIPTION OF THE PREFERRED EMBODIMENT

Figure 1:
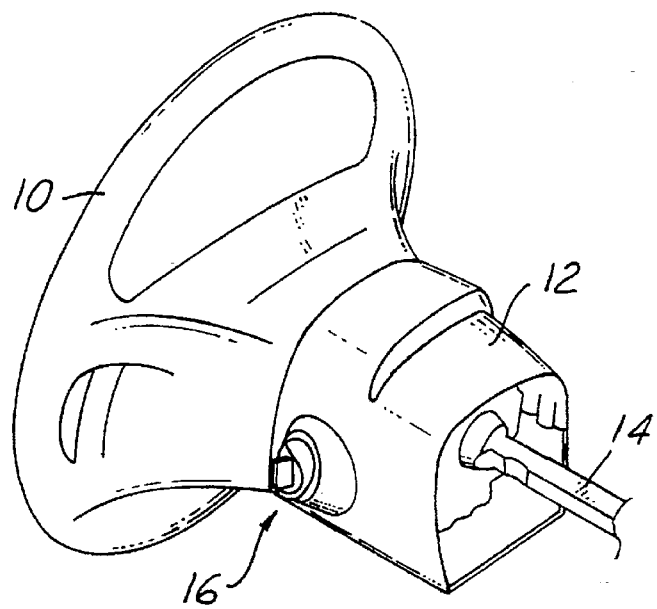
FIG. 1 is a perspective view of an automotive vehicle steering column showing an ignition key system and lock cylinder extending therefrom.
Figure 2:
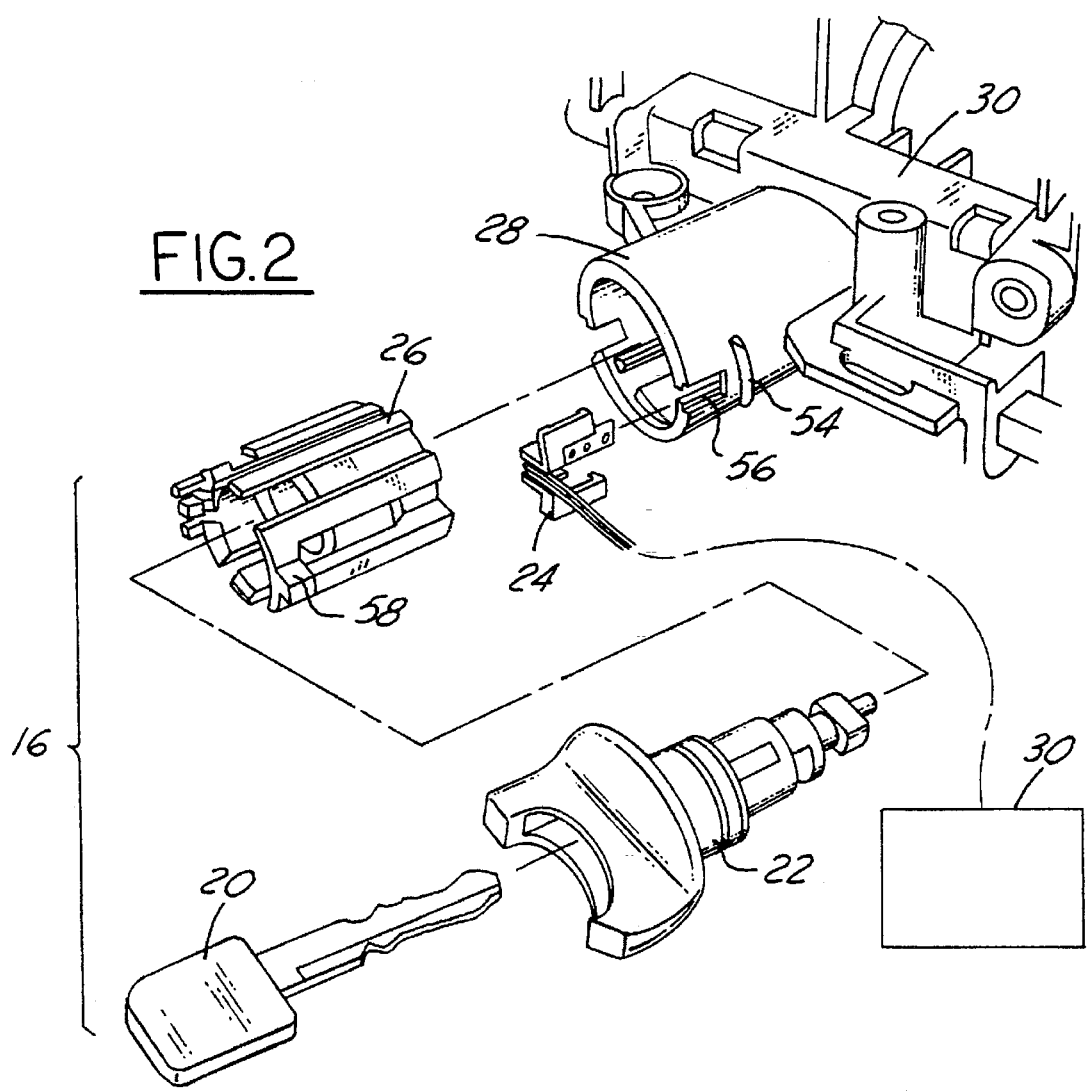
FIG. 2 is an exploded perspective view of an ignition system having an anti-theft sensor contact mechanism according to the present invention.

Turning now to the drawings, and in particular to FIG. 1 thereof, an automotive vehicle steering wheel 10 is shown in abutting relationship to a steering column assembly 12 and has a steering shaft 14 extending therefrom for attachment to a steering gear (not shown). An ignition key system 16 protrudes through the steering column assembly 12 to prevent ignition of the automobile's engine in absence of a key. Referring to FIG. 2, the ignition key system 16 contains a steering shaft locking device (not shown) that retains the steering wheel 10 in a fixed position when the ignition is turned off and an ignition key 20 is removed from an ignition lock 22. As will be appreciated by those skilled in the art, and even those not skilled in the art but who have had the unpleasant experience of having an automobile stolen, thieves may forcibly remove the steering shaft locking device after gaining entry to the vehicle passenger compartment in order to release the steering shaft 14 and thereby allow maneuverability of the vehicle through the steering wheel 10.

The present invention provides an improved anti-theft sensor contact mechanism 24 which senses the physical presence of a lock liner 26 within the lock cylinder 28 of the steering casting 30 (FIG. 3). When the lock liner 26 is removed, the sensor contact mechanism 24 causes a break in an electrical path in an electrical monitoring circuit 32 (FIG. 2) so that a conventional alarm system (not shown) may be triggered to sound an audible or visible alarm.

Turning now to FIGS. 4 through 7, the sensor contact mechanism has a housing 34 defining a switching chamber 36 in which are mounted a stationary contact 38 fixed within the chamber 36 and a moveable contact 40. The moveable contact 40 is flexibly biased toward a first position in non-contacting relationship with the stationary contact 38 (FIG. 6) and is moveable to a second position in contacting relationship with the stationary contact 38 (FIG. 7). The housing 34 has a housing top wall 42 which rests adjacent the lock liner 26 when inserted into the lock cylinder 28. An opening 44 in the top wall 42 (FIG. 5) allows a lever 46, which is attached to the moveable contact 40, to extend exteriorly from the housing 34 (FIGS. 4 and 6) so as to be depressed by the lock liner 26 and thus deflect the moveable contact 40 from the first position (FIG. 6) to the second position when the lock liner 26 is inserted into the lock cylinder 28 (FIG. 7). The lever 46 is electrically insulated from the moveable contact 40 so as not to conduct electrical current to the lock liner 26.

As seen in FIG. 4, a post 48 extends generally perpendicular from one end of the housing 34, and a pair of snaps 50 attached to the post 48 extend generally parallel to the housing 34. The snaps 50 each have a clip 52 which attaches over a flange 54 on an outer surface of the lock cylinder 28 (FIGS. 3 and 6). The post 48 fits into a longitudinal slot 56 (FIG. 2) and is held in place by a knob 58 on the lock liner 26.

The contacts 38, 40 are preferably made of the same metal, for example stainless steel, to reduce galvanic corrosion. In a preferred embodiment, the contact surfaces 38', 40' of the contacts 38, 40 (FIG. 7) are gold-plated to ensure a good contact therebetween and to eliminate galvanic corrosion.

The stationary contact 38 is preferably insert molded into the housing 34 along with a resistor 60. Leads 62 of the resistor 60 are positioned in physical contact with the stationary contact 38 (FIG. 6). Separate conducting wires 64, 66 are connected to the contacts 38, 40, respectively, as seen in FIGS. 6 and 7. The wires 64, 66 are connected with a monitoring circuit 32, such as that described in the aforementioned U.S. Pat. No. 4,803,460. It will be apparent to those skilled in the art that neither the stationary contact 38, the moveable contact 40, or the lever 46 serve as a grounding contact to the steering column, or any other part of the vehicle.

The just described sensor contact mechanism 24 of the present invention utilizes a non-conducting lever 46 to sense the physical presence of a lock liner 26 within a lock cylinder 28 and to depress a moveable contact 40 against a stationary contact 38 of the same metal for closing a path in an electrical monitoring, or sensing, circuit 32. Electrical continuity between the contacts 38, 40 is enhanced by enclosing them within a housing 34 through which the lever 46 protrudes to prevent dirt, grease, oil, and other surface coating debris from inhibiting electrical contact therebetween. The electrical circuit 32 is not grounded through the steering column casting 30 through the lever 46, but is grounded through continuous wires 64, 66 attached to the contacts. The electrical circuit 32 is, therefore, not grounded through the steering column casting 30 by way of the stationary of moveable contacts 38, 40.

Although the preferred embodiment of the present invention has been disclosed, various changes and modifications may be made without departing from the scope of the invention as set forth in the appended claims.

We claim:

1. An anti-theft sensor contact mechanism for a ignition lock and lock liner within a lock cylinder of an automotive vehicle, the mechanism comprising:

a sensor housing;

a first contact within said housing;

a second contact mounted within said housing for deflectable movement with respect to said first contact, said second contact having a first position in non-contacting relationship with said first contact and a second position in contacting relationship with said first contact, said second contact flexibly biased toward said first position;

lever means for deflecting said second contact from said first position to said second position, said lever means extending exteriorly from said housing so as to be depressed into said housing when said lock liner is inserted into said lock cylinder;

attachment means for attaching said housing to said lock cylinder; and monitoring means in electrical connection with said first and second contacts wherein none of said first contact, said second contact, and said lever means serves as a ground path for said monitoring means.

2. An anti-theft sensor contact mechanism according to claim 1 wherein said first and second contacts are made of the same metal.

3. An anti-theft sensor contact mechanism according to claim 2 wherein said lever means comprises a compliant lever attached to said second contact.

4. An anti-theft sensor contact mechanism according to claim 3 wherein said lever extends through an opening in a housing wall adjacent said lock liner.

5. An anti-theft sensor contact mechanism according to claim 1 wherein said first and second contacts are gold plated.

6. An anti-theft sensor contact mechanism according to claim 1 wherein said attachment means comprises at least one snap on said housing which is adapted to connect to a flange on said lock cylinder.

7. An anti-theft sensor contact mechanism for an ignition system having an ignition lock in concentric relationship within a lock liner in a lock cylinder on a steering column of an automotive vehicle, the mechanism comprising:

a sensor housing defining a switching chamber therein;

a stationary contact fixed within the chamber;

a moveable contact mounted within the chamber flexibly biased toward a first position in non-contacting relationship with the stationary contact and moveable to a second position in contacting relationship with the stationary contact;

a lever insulatingly attached to the moveable contact and extending exteriorly from the housing through an opening in a housing wall adjacent the lock liner for deflecting the moveable contact from the first position to second position when the lock liner is inserted into the lock cylinder, the lever isolating the moveable contact and the stationary contact from the lock cylinder;

attachment means for attaching the housing to the lock cylinder; and a monitoring circuit in electrical connection with the stationary contact and the moveable contact, and not grounded to the steering column through said contacts.

8. An anti-theft sensor contact mechanism according to claim 7 wherein the stationary contact is insert molded within the housing.

9. An anti-theft sensor contact mechanism according to claim 7 wherein the attachment means comprises at least one snap on the housing which connects to a flange on the lock cylinder.

10. An anti-theft sensor contact mechanism according to claim 7 wherein the moveable contact and the stationary contact are gold plated.

11. An anti-theft sensor contact mechanism for an ignition system having an ignition lock in concentric relationship within a lock liner in a lock cylinder on a steering column of an automotive vehicle, the mechanism comprising:

a sensor housing defining a switching chamber therein;

a stationary contact fixed within the chamber;

a moveable contact mounted within the chamber flexibly biased toward a first position in non-contacting relationship with the stationary contact and moveable to a second position in contacting relationship with the stationary contact;

non-conducting lever means attached to the movable contact for sensing the physical presence of an object adjacent to the housing and for deflecting the movable contact from the first position into the second position when such physical presence is sensed, the lever means extending exteriorally from the housing through an opening therein and deflectable through the opening into the housing upon sensing of an object, the lever means isolating the moveable contact and the stationary contact therefrom;

attachment means for attaching the housing to the lock cylinder; and a monitoring circuit in electrical connection with the stationary contact and the moveable contact, and not grounded to the steering column through said contacts.

* * * * *